(12) United States Patent
Klatt (10) Patent No.: US 9,282,496 B2
(45) Date of Patent: Mar. 8, 2016

(54) METHOD FOR USING A USER EQUIPMENT WITH A FIRST PUBLIC LAND MOBILE NETWORK AND WITH A SECOND PUBLIC LAND MOBILE NETWORK, USER EQUIPMENT, PROGRAM AND COMPUTER PROGRAM PRODUCT

(71) Applicant: DEUTSCHE TELEKOM AG, Bonn (DE)

(72) Inventor: Axel Klatt, Cologne (DE)

(73) Assignee: DEUTSCHE TELEKOM AG, Bonn (DE)

( * ) Notice: Subject to any disclaimer, the term of this patent is extended or adjusted under 35 U.S.C. 154(b) by 0 days.

(21) Appl. No.: 14/380,377

(22) PCT Filed: Feb. 14, 2013

(86) PCT No.: PCT/EP2013/000435
§ 371 (c)(1),
(2) Date: Aug. 22, 2014

(87) PCT Pub. No.: WO2013/124046
PCT Pub. Date: Aug. 29, 2013

(65) Prior Publication Data
US 2015/0017982 A1  Jan. 15, 2015

(30) Foreign Application Priority Data
Feb. 24, 2012 (EP) .................................. 12001239

(51) Int. Cl.
*H04W 36/14* (2009.01)
*H04W 68/00* (2009.01)
(Continued)

(52) U.S. Cl.
CPC .......... *H04W 36/14* (2013.01); *H04W 36/0072* (2013.01); *H04W 68/00* (2013.01); *H04W 76/048* (2013.01); *H04W 84/042* (2013.01); *H04W 88/06* (2013.01)

(58) Field of Classification Search
CPC ............ H04W 36/14; H04W 36/0072; H04W 76/048; H04W 84/042
See application file for complete search history.

(56) References Cited

U.S. PATENT DOCUMENTS

| 2009/0131054 A1 | 5/2009 | Zhang |
| 2010/0202429 A1 | 8/2010 | Chin et al. |

(Continued)

FOREIGN PATENT DOCUMENTS

WO   WO 2011056250 A1   5/2011

OTHER PUBLICATIONS

3GPP TS 25.304, Universal Mobile Telecommunications System (UMTS); User Equipment (UE) procedures in idle mode and procedures for cell reselection in connected mode, Version 8.5.0, Release 8, Apr. 2009.

(Continued)

*Primary Examiner* — Leon Flores
(74) *Attorney, Agent, or Firm* — Leydig, Voit & Mayer, Ltd.

(57) ABSTRACT

A method for using a user equipment with a first public land mobile network (PLMN) and with a second PLMN includes: operating the user equipment in a plurality of idle modes. The user equipment is a Dual Subscriber Identity Module (SIM) Dual Standby (DSDS) user equipment. With respect to the first PLMN and with respect to an idle mode of the user equipment in the first PLMN, a first discontinuous reception scheme is implemented in case that the first PLMN is a registered public land mobile network (RPLMN) to the user equipment. With respect to the second PLMN and with respect to an idle mode of the user equipment in the second PLMN, a second discontinuous reception scheme is implemented in case that the second PLMN is a RPLMN to the user equipment.

13 Claims, 2 Drawing Sheets (51) Int. Cl.
*H04W 36/00* (2009.01)
*H04W 76/04* (2009.01)
*H04W 84/04* (2009.01)
*H04W 88/06* (2009.01)

(56) References Cited

U.S. PATENT DOCUMENTS

2011/0217969 A1   9/2011   Spartz et al.
2012/0088502 A1*  4/2012   Chin et al. .................... 455/433
2012/0264390 A1* 10/2012   Clevorn et al. ................ 455/313
2013/0090137 A1*  4/2013   Krishnamoorthy et al. .. 455/458

OTHER PUBLICATIONS

3GPP TS 22.011, 3rd Generation Partnership Project; Technical Specification Group Services and System Aspects; Service accessibility, Version 10.1.0, Release 10, Sep. 2010.

3GPP TS 23.122, 3rd Generation Partnership Project; Technical Specification Group Core Network and Terminals; Non-Access-Stratum (NAS) functions related to Mobile Station (MS) in idle mode, Version 10.1.0, Release 10, Sep. 2010.

* cited by examiner

METHOD FOR USING A USER EQUIPMENT WITH A FIRST PUBLIC LAND MOBILE NETWORK AND WITH A SECOND PUBLIC LAND MOBILE NETWORK, USER EQUIPMENT, PROGRAM AND COMPUTER PROGRAM PRODUCT

CROSS-REFERENCE TO RELATED APPLICATIONS

This application is a U.S. National Phase application under 35 U.S.C. §371 of International Application No. PCT/EP2013/000435, filed on Feb. 14, 2013, and claims benefit to European Patent Application No. EP 12001239.8, filed on Feb. 24, 2012. The International Application was published in English on Aug. 29, 2013 as WO 2013/124046 under PCT Article 21(2).

FIELD

The present invention relates a method for using a user equipment with a first public land mobile network and with a second public land mobile network, wherein the user equipment is a DSDS user equipment (Dual SIM dual standby user equipment).

The present invention further relates to a user equipment for use with a first public land mobile network and with a second public land mobile network, wherein the user equipment is a DSDS user equipment (Dual SIM dual standby user equipment).

BACKGROUND

In cellular mobile systems like GSM (Global System for Mobile communication) (but also in cellular public land mobile networks according to its successors like UMTS (Universal Mobile Telecommunications System) or E-UTRAN (Evolved UMTS Terrestrial Radio Access Network)/LTE (Long Term Evolution)), the so-called "PLMN Selection" (PLMN=Public Land Mobile Network) is performed by the user equipment (UE) as defined in [3GPP TS 22.011]. Subsequently this selected PLMN becomes the so-called "registered public land mobile network" or "registered PLMN" (RPLMN) of the terminal (user equipment). Details can be found in [3GPP TS 23.122] for cellular mobile systems according to the 3GPP standard.

While a user equipment is kept registered on the registered public land mobile network, it can originate mobile originated calls (MOC) and receive mobile terminated calls (MTC). This is the default state a normal UE is in, in order to provide service to the customer.

Typically in cellular mobile systems each user equipment has only a single public land mobile network to which is has been registered (single registered public land mobile network) and to and from which services like MOC and MTC are provided.

As a single public land mobile network can provide typically all service other PLMNs can also offer. The main reason to select a certain public land mobile network or operator for a contract is—besides quality of the network—the price of the service being charged. As there is a desire of customers to optimise payments in the recent past so-called "Dual-SIM/Dual-Standby" (DSDS) devices came to the markets. Such user equipments are, e.g., known from the publication US 2011/0217969 A1.

These DSDS terminals or user equipments consist basically of two terminals in a single terminal housing. For price reasons, these terminals do not consist of two fully independent terminals in a single housing, but manufacturers of such devices aim to reuse as much as possible of the device to allow independent operation.

For the end customers such devices allow the operation of a single device in two independent cellular public land mobile networks. Therefore, it is possible to use two independent subscriptions also with two different operators. This provides multiple possibilities to the customer, like:

Being reachable with two independent telephone numbers (e.g. a private and a business one);

Allow two different contracts (e.g. a private one for private calls and a business one)

In case of abroad roaming, a local subscription to receive and place cheap local (national) calls and the normal international subscription to be reachable via the normal number;

Different types of contracts with the different public land mobile networks, such as a voice call contract with the first public land mobile network (PLMN 1) and a data contract with the second public land mobile network (PLMN 2);

A single terminal with two subscriptions in different regions (no need to swap SIMs) when no roaming between the operators is in place.

It is possible with a single DSDS device or DSDS user equipment to use more than a single radio access technology concurrently on the same or different PLMNs.

Technically, such DSDS user equipments or DSDS mobile devices consist of two subscriber identity modules (SIM) inserted in two terminal devices, while both of the baseband devices are sharing a single radio frequency front-end for cost reasons.

In order to save power consumption of mobile devices (user equipments), cellular systems (i.e. cellular public land mobile networks)—like any of the 3GPP systems—implement the concept of discontinuous reception (DRX). This concept allows battery powered devices like mobile phones as user equipments to optimise the power consumption by falling into a so-called "sleep mode" most of the time while no communication is ongoing. The systems typically have defined "wakeup-times" during which the terminal listens to the Paging Channel (PCH) which notifies terminals about MTC (Mobile Terminated Calls). These wake-up times are defined for example for UMTS in [3GPP TS 25.304] and E-UTRAN/LTE in [3GPP TS 36.304].

Terminals (user equipments) are configured to follow a predefined interval, called DRX cycle, i.e. a time interval, which defines times during which the terminal is required to be pageable via the PCH. Typical time intervals or cycles are ranging between 0.320 s and 2.56 s. E.g. by defining a DRX cycle of 1.28 s, the terminal needs to wake up every 1.28 s to receive a potentially mobile terminating call which is indicated via the paging channel PCH. If the terminal in a given DRX occasion is not addressed on the PCH, it will fall back to sleep and wake up after another period of the time interval, i.e.—in this example—after another 1.28 s. The given reference specifications also define a formula how a UE has to calculate it's assigned DRX cycle using parameters from the broadcast channels of the given cellular public land mobile network and other input parameters, such as the SIM International Mobile Subscriber Identity (IMSI) of the user equipment.

The network is aware of the timing of the user equipment DRX cycle and thus will page the terminal on the PCH only at those times when the terminal is woken up and listens to the PCH.

This DRX concept has also the benefit that the paging rate for terminals can be spread in time as not all terminals follow the same DRX cycle and thus will not be paged at the same point in time. This concept allows efficient utilisation of the PCH channel resources.

DSDS terminals in contrast to a normal single SIM UE have two independent SIM cards (also with individual IMSIs). Hence in order to be pageable they also need to follow two independent DRX cycles (typically calculated based on the individual IMSIs).

The subscriptions of the two SIM cards can either relate to the same public land mobile network or to different public land mobile networks.

For the case of independent public land mobile networks (i.e. the first public land mobile network is different to the second public land mobile network), no coordination of the individual DRX cycles is possible due to the fact that the public land mobile networks are not coordinated (i.e. there is an absolute time offset between the beginning of a radio frame (or other timing structure) in the first public land mobile network and the beginning of a radio frame (or other timing structure) in the second public land mobile network), the user equipment tracks both of the DRX cycles on its own. This becomes especially problematic while a DSDS user equipment is in idle mode with both the first and the second public land mobile network as a lot more wake up times are to be respected in such a situation.

With state of the art DSDS terminals or user equipments, typically the user equipment autonomously tunes its radio front-end at the time intervals implied for the individual DRX cycles from the second public land mobile network to the first public land mobile network or vice versa in order to ensure that MTCs from both the first and the second PLMN are not missed. As each wake up and sleep cycle also requires preparation and checking operations, a higher number of wake up times per time unit means a higher battery drain to the mobile device (or user equipment) resulting in a shorter standby time.

SUMMARY

In an embodiment, the invention provides a method for using a user equipment with a first public land mobile network (PLMN) and with a second PLMN. The method includes: operating the user equipment in a plurality of idle modes. The user equipment is a Dual Subscriber Identity Module (SIM) Dual Standby (DSDS) user equipment. With respect to the first PLMN and with respect to an idle mode of the user equipment in the first PLMN, a first discontinuous reception scheme is implemented in case that the first PLMN is a registered public land mobile network (RPLMN) to the user equipment. In the first discontinuous reception scheme of the user equipment, a first paging occasion time interval is defined by: a first time interval corresponding to a first discontinuous reception cycle length, and a first paging time within the first time interval such that, in the first discontinuous reception scheme, the user equipment needs only to monitor a paging channel during the first paging occasion time interval. With respect to the second PLMN and with respect to an idle mode of the user equipment in the second PLMN, a second discontinuous reception scheme is implemented in case that the second PLMN is a RPLMN to the user equipment. In the second discontinuous reception scheme of the user equipment, a second paging occasion time interval is defined by: a second time interval corresponding to a second discontinuous reception cycle length, and a second paging time within the second time interval such that, in the second discontinuous reception scheme, the user equipment needs only to monitor a paging channel during the second paging occasion time interval. The beginning of the first paging occasion time interval and the beginning of the second paging occasion time interval are spaced in time in a predetermined manner by a separation time interval.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

The present invention provides a simple solution for using a user equipment with a first public land mobile network and with a second public land mobile network that provides an enhanced standby time for DSDS user equipments, especially in situations as described above. The present invention, therefore, relates to a possibility to enhance standby time while still allowing a DSDS user equipment to operate in two RATs (Radio Access Technologies) of the same public land mobile network or in two public land mobile networks concurrently while reducing the number of wake up and sleep cycles. It enables the enhanced efficiency for the terminal standby time by taking individual parameters of more than one cellular public land mobile network into account with regard to the operation of a single terminal concurrently in two cellular public land mobile network networks.

In an embodiment, present invention provides a method for using a user equipment with a first public land mobile network and with a second public land mobile network, wherein the user equipment is a DSDS user equipment (Dual SIM dual standby user equipment), wherein with respect to the first public land mobile network and with respect to an idle mode of the user equipment in the first public land mobile network, a first discontinuous reception scheme is implemented in case that the first public land mobile network is a registered public land mobile network to the user equipment, wherein in the first discontinuous reception scheme of the user equipment, a first paging occasion time interval is defined by means of:

a first time interval corresponding to a first discontinuous reception cycle length, and a first paging time within the first time interval such that, in the first discontinuous reception scheme, the user equipment needs only to monitor a paging channel during the first paging occasion time interval, wherein with respect to the second public land mobile network and with respect to an idle mode of the user equipment in the second public land mobile network, a second discontinuous reception scheme is implemented in case that the second public land mobile network is a registered public land mobile network to the user equipment, wherein in the second discontinuous reception scheme of the user equipment, a second paging occasion time interval is defined by means of:

a second time interval corresponding to a second discontinuous reception cycle length, and a second paging time within the second time interval such that, in the second discontinuous reception scheme, the user equipment needs only to monitor a paging channel during the second paging occasion time interval, wherein the beginning of the first paging occasion time interval and the beginning of the second paging occasion time interval are spaced in time in a predetermined manner by a separation time interval.

The method enables enhanced standby times of user equipments operating in a concurrent mode in more than a single PLMN. The present invention is aimed at so-called dual-SIM dual standby (DSDS) terminals (also called DSDS user equipments), which allow concurrent operation of such terminals in at least two cellular radio technologies or PLMNs. The method and program is applicable for any combination of at least two cellular networks, like for example: GERAN, UTRAN, LTE/E-UTRAN, LTE-Advanced, cdma2000, WiMAX, WiBro, WLAN etc or and variants thereof.

According to the present invention, it is advantageously possible that discontinuous reception schemes of the two public land mobile networks the DSDS user equipment is registered with can be aligned or coordinated such that the number of sleep and wake up times is considerably reduced and hence the overall battery drain for realizing idle mode pageability (especially for mobile terminated calls and/or data transmissions) of the user equipment in both the first public land mobile network and the second public land mobile network reduced.

Typically, in a given public land mobile network and for a given user equipment, the paging occasion time interval (and hence the paging time) is determined by the IMSI number, i.e. the paging occasion time interval is fixedly linked to the IMSI of the user equipment. This means that the operation of a DSDS user equipment in idle mode in two different public land mobile networks requires the implementation of the two respective discontinuous reception schemes (of the two public land mobile networks), with a more or less even probability for the two paging occasion time intervals occurring within the respective discontinuous reception cycle length. As a result, there may be the case of the paging occasion time intervals maximally spaced apart (in time), as well as overlapping paging occasion time intervals. In any case, without any change or adaptation of the discontinuous reception schemes in the different public land mobile networks, the distribution of the paging occasion time interval is random, and there is no predetermined relationship between the respective paging occasion time intervals and hence no possibility of alignment or coordination. According to the present invention, this random relationship between the paging occasion time intervals of the two public land mobile networks to which a DSDS user equipment is registered with is removed such that the beginning of the first paging occasion time interval and the beginning of the second paging occasion time interval are spaced in time in a predetermined manner by a separation time interval.

According to another embodiment of the present invention, it is preferred that, in a first mode of operation of the user equipment, only the first public land mobile network is a registered public land mobile network to the user equipment, wherein, in a second mode of operation of the user equipment, only the second public land mobile network is a registered public land mobile network to the user equipment, wherein, in a third mode of operation of the user equipment, both the first and the second public land mobile networks are registered public land mobile networks to the user equipment, wherein the first and second discontinuous reception scheme is implemented in the third mode of operation of the user equipment, wherein either:

in the first mode of operation of the user equipment, a first modified discontinuous reception scheme is implemented with respect to the first discontinuous reception scheme, wherein the first modified discontinuous reception scheme comprises at least a first modified paging time different from the first paging time, the second discontinuous reception scheme being identical in the second and third modes of operation, or in the second mode of operation of the user equipment, a second modified discontinuous reception scheme is implemented with respect to the second discontinuous reception scheme, wherein the second modified discontinuous reception scheme comprises at least a second modified paging time different from the second paging time, the first discontinuous reception scheme being identical in the first and third modes of operation, or in the first mode of operation of the user equipment, a first modified discontinuous reception scheme is implemented with respect to the first discontinuous reception scheme, wherein the first modified discontinuous reception scheme comprises at least a first modified paging time different from the first paging time, and in the second mode of operation of the user equipment, a second modified discontinuous reception scheme is implemented with respect to the second discontinuous reception scheme, wherein the second modified discontinuous reception scheme comprises at least a second modified paging time different from the second paging time.

According to the present invention, it is thereby advantageously possible that—in the third mode of operation of the user equipment—the discontinuous reception schemes or discontinuous reception cycles can be easily aligned or coordinated by adjusting or shifting at least one paging time in the concurrent idle mode operation (in both the first and second public land mobile network) of the user equipment compared to the discontinuous reception scheme realized in the first public land mobile network or the second public land mobile network respectively. According to the present invention, this can be done either by shifting only the first paging time (without shifting the second paging time) or shifting only the second paging time (without shifting the first paging time) or shifting both the first and the second paging time. In the context of the present invention, the terms "first discontinuous reception scheme", "second discontinuous reception scheme", "first paging time", and "second paging time" refer to the coordinated situation, i.e. to the third mode of operation of the user equipment (concurrently in the first and second public land mobile networks), whereas the terms "first modified discontinuous reception scheme", "second modified discontinuous reception scheme", "first modified paging time", and "second modified paging time" refer to the non-coordinated situation with a randomized distribution of the paging times, i.e. to the situations of the first and second mode of operation where the first and second public land mobile networks are not concurrently used by a DSDS user equipment.

According to a first variant of a further preferred embodiment of the present invention, during changing, from either the first or the second mode of operation of the user equipment, to the third mode of operation of the user equipment, a first timing information is transmitted from the user equipment to the first public land mobile network and/or a second timing information is transmitted from the user equipment to the second public land mobile network, the first timing information being indicative of the difference between the first modified discontinuous reception scheme and the first discontinuous reception scheme, the second timing information being indicative of the difference between the second modified discontinuous reception scheme and the second discontinuous reception scheme.

According to a second variant of a further preferred embodiment of the present invention, during the third mode of operation of the user equipment, a first timing information is transmitted from the user equipment to the first public land mobile network and/or a second timing information is transmitted from the user equipment to the second public land mobile network, the first timing information being indicative of the difference between the first modified discontinuous reception scheme and the first discontinuous reception scheme, the second timing information being indicative of the difference between the second modified discontinuous reception scheme and the second discontinuous reception scheme.

According to both mentioned variants of the present invention, it is advantageously possible according to the present invention that the first and/or the second public land mobile network receives the relevant information for alignment or coordination of the discontinuous reception schemes. According to the first variant, the relevant information to align the paging occasion time intervals is transmitted from the user equipment to the first and/or second public land mobile network during changing to the idle mode of the user equipment (i.e. performing the attach procedure) with respect to both public land mobile networks. Changing from the first mode of operation of the user equipment to the third mode of operation of the user equipment means that the user equipment is first registered (solely) with first public land mobile network, and (in the third mode of operation) also with the second public land mobile network. Changing from the second mode of operation of the user equipment to the third mode of operation of the user equipment means that the user equipment is first registered (solely) with second public land mobile network, and (in the third mode of operation) also with the first public land mobile network. In both cases and in order to align or coordinate the discontinuous reception schemes in the third mode of operation, it is provided for either a shift of the paging occasion time interval in the first public land mobile network (by means of transmitting the first timing information to the first public land mobile network aiming at changing the first modified discontinuous reception scheme to the first discontinuous reception scheme), or a shift of the paging occasion time interval in the second public land mobile network (by means of transmitting the second timing information to the second public land mobile network aiming at changing the second modified discontinuous reception scheme to the second discontinuous reception scheme), or a shift of the paging occasion time intervals both in the first and second public land mobile networks (by means of transmitting the first timing information to the first public land mobile network (aiming at changing the first modified discontinuous reception scheme to the first discontinuous reception scheme) and the second timing information to the second public land mobile network (aiming at changing the second modified discontinuous reception scheme to the second discontinuous reception scheme)).

According to the second variant, the first and/or second timing information is transmitted to the first and/or second public land mobile network while the user equipment being in the third mode of operation.

According to still a further preferred embodiment of the present invention, the separation time interval is shorter than 50 milliseconds, preferably shorter than 20 milliseconds, more preferably shorter than 10 milliseconds.

This means that the first paging occasion time interval and the second paging occasion time interval typically follow directly one another, i.e. either the first paging occasion time interval is followed more or less directly by the second paging occasion time interval, or the first paging occasion time interval is followed more or less directly by the first paging occasion time interval.

According to another preferred embodiment of the present invention, the first timing information indicates the first paging time or the first paging time and the first time interval or the first paging time, the first time interval, and an offset information indicative of the absolute time offset between the beginning of a radio frame in the first public land mobile network and the beginning of a radio frame in the second public land mobile network.

According to such an embodiment, it is possible for the user equipment to indicate to the first public land mobile network—by means of the first timing information—the shifted paging occasion time interval. It is preferred according to the present invention that not only the first paging time is shifted but that also the first time interval (i.e. the discontinuous reception cycle length) is modified. The indication of an offset information indicative of the absolute time offset between the beginning of a radio frame in the first public land mobile network and the beginning of a radio frame in the second public land mobile network still further enables to precisely define the shifted first paging time. Of course, it is also preferred according to the present invention that the second timing information indicates the second paging time, or the second paging time and the second time interval, or the second paging time, the second time interval, and the offset information indicative of the absolute time offset between the beginning of a radio frame in the first public land mobile network and the beginning of a radio frame in the second public land mobile network.

According to the present invention, it is furthermore preferred that the first timing information is transmitted from the user equipment to the first public land mobile network, and/or the second timing information is transmitted from the user equipment to the second public land mobile network by means of a RRC (Radio Ressource Control) connection request message or by means of a RRC connection request complete message.

This solution especially relates to the first variant mentioned above, where the first and/or second timing information being indicative of the first and/or second paging occasion time interval is transmitted during changing from either the first or the second mode of operation to the third mode of operation of the user equipment. However, it is also possible to use a RRC (Radio Resource Control) connection request message or a RRC connection request complete message to transmit the first and/or second timing information while the user equipment being already in the third mode of operation. Additionally, it is also possible to transmit the first and/or second timing information (being indicative of the first and/or second paging occasion time interval)—either during the initiation of the third mode of operation or while the user equipment being in the third mode of operation—by means of another message or type of message, e.g. by using RRC signalling or NAS signalling during the attach procedure (of the user equipment with the first and/or second public land mobile network).

Furthermore, the present invention relates to a user equipment for use with a first public land mobile network and with a second public land mobile network, wherein the user equipment is a DSDS user equipment (Dual SIM dual standby user equipment), wherein with respect to the first public land mobile network and with respect to an idle mode of the user equipment in the first public land mobile network, a first discontinuous reception scheme is implemented in case that the first public land mobile network is a registered public land mobile network to the user equipment, wherein in the first discontinuous reception scheme of the user equipment, a first paging occasion time interval is defined by means of:

a first time interval corresponding to a first discontinuous reception cycle length, and a first paging time within the first time interval such that, in the first discontinuous reception scheme, the user equipment needs only to monitor a paging channel during the first paging occasion time interval, wherein with respect to the second public land mobile network and with respect to an idle mode of the user equipment in the second public land mobile network, a second discontinuous reception scheme is implemented in case that the second public land mobile network is a registered public land mobile network to the user equipment, wherein in the second discontinuous reception scheme of the user equipment, a second paging occasion time interval is defined by means of:

a second time interval corresponding to a second discontinuous reception cycle length, and a second paging time within the second time interval such that, in the second discontinuous reception scheme, the user equipment needs only to monitor a paging channel during the second paging occasion time interval, wherein the beginning of the first paging occasion time interval and the beginning of the second paging occasion time interval are spaced in time in a predetermined manner by a separation time interval.

With such a user equipment, it is advantageous according to the present invention that the number sleep and wake up cycles and hence the battery drain in idle mode can be reduced.

It is furthermore preferred according to the present invention—also with respect to the user equipment—that, in a first mode of operation of the user equipment, only the first public land mobile network is a registered public land mobile network to the user equipment, wherein, in a second mode of operation of the user equipment, only the second public land mobile network is a registered public land mobile network to the user equipment, wherein, in a third mode of operation of the user equipment, both the first and the second public land mobile networks are registered public land mobile networks to the user equipment, wherein the first and second discontinuous reception scheme is implemented in the third mode of operation of the user equipment, wherein either:

in the first mode of operation of the user equipment, a first modified discontinuous reception scheme is implemented with respect to the first discontinuous reception scheme, wherein the first modified discontinuous reception scheme comprises at least a first modified paging time different from the first paging time, the second discontinuous reception scheme being identical in the second and third modes of operation, or in the second mode of operation of the user equipment, a second modified discontinuous reception scheme is implemented with respect to the second discontinuous reception scheme, wherein the second modified discontinuous reception scheme comprises at least a second modified paging time different from the second paging time, the first discontinuous reception scheme being identical in the first and third modes of operation, or in the first mode of operation of the user equipment, a first modified discontinuous reception scheme is implemented with respect to the first discontinuous reception scheme, wherein the first modified discontinuous reception scheme comprises at least a first modified paging time different from the first paging time, and in the second mode of operation of the user equipment, a second modified discontinuous reception scheme is implemented with respect to the second discontinuous reception scheme, wherein the second modified discontinuous reception scheme comprises at least a second modified paging time different from the second paging time.

According to further preferred embodiments of the present invention—also with respect to the user equipment—it is preferred that during changing, from either the first or the second mode of operation of the user equipment, to the third mode of operation of the user equipment, a first timing information is transmitted from the user equipment to the first public land mobile network and/or a second timing information is transmitted from the user equipment to the second public land mobile network, the first timing information being indicative of the difference between the first modified discontinuous reception scheme and the first discontinuous reception scheme, the second timing information being indicative of the difference between the second modified discontinuous reception scheme and the second discontinuous reception scheme.

Additionally, the present invention relates to a program comprising a computer readable program code which, when executed on a computer or on a user equipment, causes the computer or the user equipment to perform the inventive method.

Still additionally, the present invention relates to computer program product for using a user equipment with a first public land mobile network and with a second public land mobile network, the computer program product comprising a computer program stored on a storage medium, the computer program comprising program code which, when executed on a computer or on a user equipment, causes the computer or the user equipment to perform the inventive method.

These and other characteristics, features and advantages of the present invention will become apparent from the following detailed description, taken in conjunction with the accompanying drawings, which illustrate, by way of example, the principles of the invention. The description is given for the sake of example only, without limiting the scope of the invention. The reference figures quoted below refer to the attached drawings.

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes.

Where an indefinite or definite article is used when referring to a singular noun, e.g. "a", "an", "the", this includes a plural of that noun unless something else is specifically stated.

Furthermore, the terms first, second, third and the like in the description and in the claims are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

Figure 1:
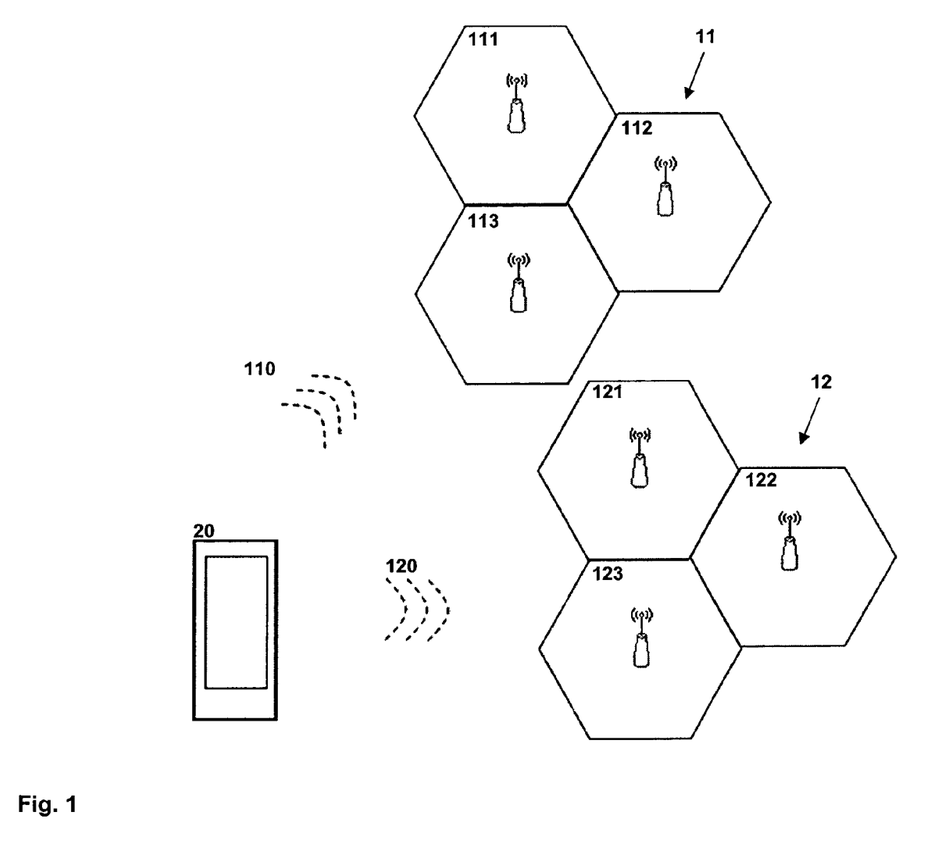
FIG. 1 schematically illustrates a user equipment being a DSDS (Dual SIM dual standby user equipment) user equipment and being used with a first public land mobile network and as second public land mobile network according to the present invention.

In FIG. 1, a user equipment 20 is schematically shown with a first public land mobile network 11 and a second public land mobile network 12. Both the first and the second public land mobile networks 11, 12 are cellular public land mobile networks and comprise a plurality of network cells or radio cells, typically served by one or a plurality of base station entities such as BTS (Base Transceiver Stations), base stations, eNB (e-NodeBs) or the like.

In the example shown in FIG. 1, the first public land mobile network 11 comprises a first radio cell 111, a second radio cell 112, and a third radio cell 113. The second public land mobile network 12 comprises a fourth radio cell 121, a fifth radio cell 122, and a sixth radio cell 123.

Furthermore, in the example shown in FIG. 1, the user equipment 20 is a so-called DSDS (Dual SIM dual standby user equipment) user equipment and is used with both the first public land mobile network 11 and the second public land mobile network 12, i.e. the user equipment 20 can especially be used concurrently both with the first public land mobile network 11 and the second public land mobile network 12. This is represented in FIG. 1 by means of a first radio frequency signal 110 indicative of the communication between the user equipment 20 and the first public land mobile network 11, and a second radio frequency signal 120 indicative of the communication between the user equipment 20 and the second public land mobile network 12. This means that the first public land mobile network 11 is a registered public land mobile network (RPLMN) to the user equipment 20 and that the second public land mobile network 12 is also a registered public land mobile network (RPLMN) to the user equipment 20.

Figure 2:
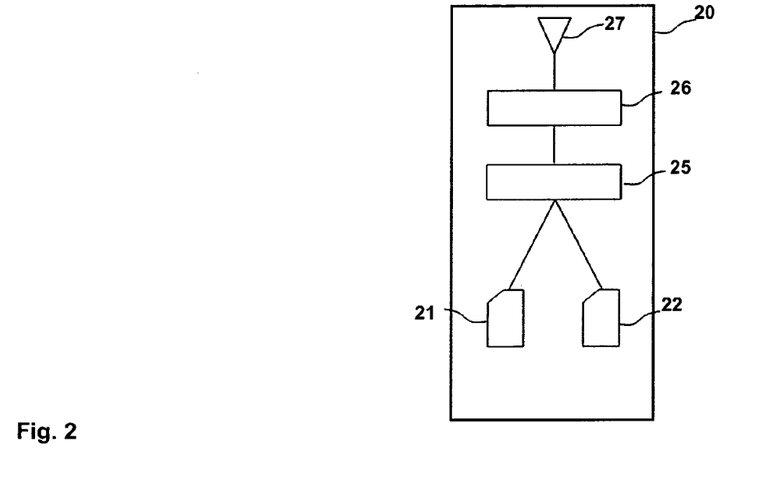
FIG. 2 schematically illustrates a DSDS (Dual SIM dual standby user equipment) equipment in the form of a block diagram.

In FIG. 2, a DSDS (Dual SIM dual standby user equipment) user equipment 20 in the form of a block diagram is schematically shown. Different parts of such a user equipment 20 are shown, namely, a first SIM card 21, the first SIM card 21 being inserted in a corresponding first SIM card module (not specifically shown in FIG. 1) of the user equipment 20, a second SIM card 22, the second SIM card 22 being inserted in a corresponding second SIM card module (not specifically shown in FIG. 1) of the user equipment 20, a baseband module 25 for handling the radio signal generation processing within the user equipment 20, a RF (radio frequency) frontend 26, and an antenna 27

Figure 3:
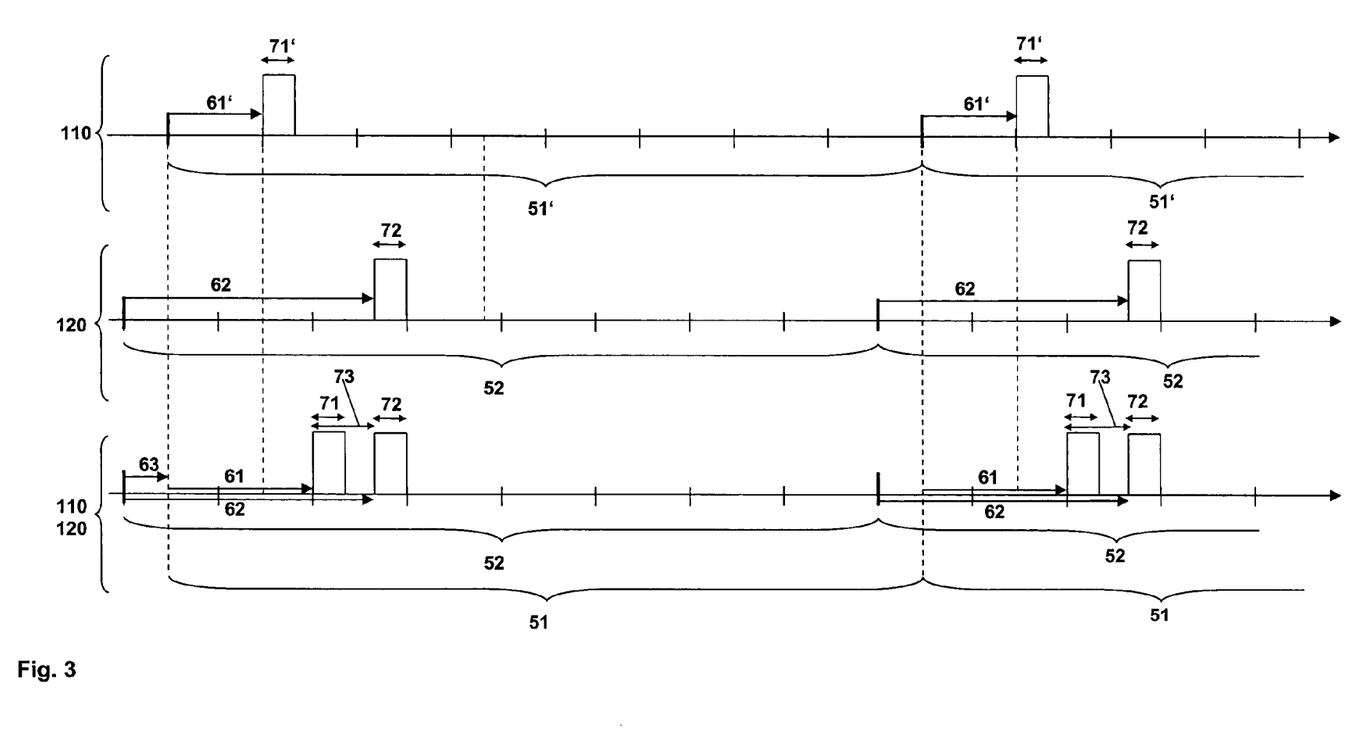
FIG. 3 schematically illustrates a timing scheme of the user equipment being registered both with the first public land mobile network and with the second public land mobile network, the user equipment being in idle mode.

In FIG. 3, a timing scheme of the user equipment 20 is schematically shown, where the user equipment 20 is potentially registered both with the first public land mobile network 11 and with the second public land mobile network 12, and the user equipment being in idle mode. The upper part of FIG. 3 represents the first mode of operation of the user equipment 20 and the exchange of the first radio frequency signal 110 of the user equipment 20 with the first public land mobile network 11. The middle part of FIG. 3 represents the second mode of operation of the user equipment 20 and the exchange of the second radio frequency signal 120 of the user equipment 20 with the second public land mobile network 12. The lower part of FIG. 3 represents the third mode of operation of the user equipment 20 and the exchange of the first and second radio frequency signals 110, 120 of the user equipment 20 with the second public land mobile network 12.

In the first mode of operation, the user equipment 20 uses a discontinuous reception scheme—in the following also called first modified discontinuous reception scheme—with respect to the first public land mobile network 11. The user equipment 20 is registered to the first public land mobile network 11 but in idle mode and uses the (first modified) discontinuous reception scheme to save energy, i.e. besides first modified paging occasion time intervals 71' (that are repeated according to the first modified discontinuous reception scheme), the user equipment 20 does not listen to a paging channel of the first public land mobile network 11.

In the second mode of operation, the user equipment 20 uses a second discontinuous reception scheme with respect to the second public land mobile network 12. The user equipment 20 is registered to the second public land mobile network 12 but in idle mode and uses the second discontinuous reception scheme to save energy, i.e. besides second paging occasion time intervals 72 (that are repeated according to the second discontinuous reception scheme), the user equipment 20 does not listen to a paging channel of the second public land mobile network 11.

In the third mode of operation of the user equipment 20, the user equipment 20 uses discontinuous reception schemes with respect to both the first and second public land mobile networks 11, 12. In order to align the discontinuous reception schemes of the first and second public land mobile networks 11, 12, the first modified discontinuous reception scheme in the first public land mobile network 11 has been altered to become the first discontinuous reception scheme, which means that the first modified paging occasion time intervals 71' (i.e. the original paging occasion time intervals of the first public land mobile network 11) have been shifted to become the first paging occasion time intervals 71 as shown in the lower part of FIG. 3. This also means that the first modified paging time 61' (of the first mode of operation) has been changed to the first paging time 61 in the third mode of operation. A first modified time interval 51' (or discontinuous reception cycle length) has remained identical to the time interval 51 both in the first and third mode of operation.

As a result from shifting the first modified paging occasion time intervals 71' to the first paging occasion time intervals 71 in the third mode of operation, the beginning of the first paging occasion time interval 71 and the beginning of the second paging occasion time interval 72 are spaced in time in a predetermined manner by a separation time interval 73.

The separation time interval 73 is advantageously chosen such that the user equipment 20 is able to be paged, with respect to the first public land mobile network 11, during the first paging occasion time intervals 71 and, with respect to the second public land mobile network 12, during the second paging occasion time intervals 72, and is able to fall asleep during a comparably long time interval after either the second paging occasion time interval (in case that the second paging occasion time intervals more or less directly follows the first paging occasion time interval—as represented in the lower part of FIG. 3) or vice versa, i.e. after the first paging occasion time interval (in case that the first paging occasion time intervals more or less directly follows the second paging occasion time interval).

The first paging occasion time interval 71 represents the time interval during which the user equipment 20 needs to be tuned to the first public land mobile network 11 in accordance to the first discontinuous reception scheme used in the communication between the user equipment 20 and the first public land mobile network 11 in the third mode of operation. The paging occasion time interval 71 is defined in relative terms with regard to a timing structure applied in the communication between the user equipment 20 and the first public land mobile network 11. In the example shown, the first time interval 51 such as having the length of a radio frame (i.e. 2.56 s) is taken to be the repetition period of the discontinuous reception scheme. Within the first time interval 51, the first paging time 61 indicates (in relative terms) when the first paging occasion time interval 71 starts (i.e. the first paging time 61 is indicative of the time offset between the beginning of each first time interval 51 and the actual beginning of the first paging occasion time interval 71). By means of adding an absolute time offset 63 between the frame structure (or other time structure elements) of the first public land mobile network 11 and the second public land mobile network 12, it is possible to define the first paging occasion time interval 71 also in absolute terms.

According to the present invention, the user equipment 20 is able to indicate to the first and/or second public land mobile networks 11, 12 individual discontinuous reception cycles to either of the first and second public land mobile networks 11, 12 and request an alignment of the different discontinuous reception cycles or schemes in order to maximize the sleep-time of the DSDS terminal.

The present invention provides enhanced standby times of DSDS terminals or user equipments in a single PLMN or in a multitude of PLMNs in the same of different RAT.

It also provides efficient operation of DSDS mobiles in a single PLMN while both subscription modules (SIMs) are using different radio access technologies (RATs), e.g. LTE for data service subscription, combined with GSM/GERAN for voice service subscription.

According to a special case, the first SIM card 21 and the second SIM card 22 can be registered in the same public land mobile network. This means that the terms "first public land mobile network 11" and "second public land mobile network 12" according to the present invention relate to the same public land mobile network, i.e. the first public land mobile network 11 and the second public land mobile network 12 are identical. Also in this specific case, it should be ensured that the sleeping time of the DSDS user equipment 20 in idle mode (in both the first and the second public land mobile network 11, 12) is maximized.

In an embodiment, the DSDS mobile operating in the same RPLMN and preferably same RAT indicates this type of DSDS operation to the serving RPLMN. This can be achieved for example by using RRC signalling or NAS signalling during the Attach procedure.

The alignment or the coordination of the discontinuous reception schemes can, e.g., be realized as follows: The second paging occasion time interval 72 (of the second public land mobile network 12) is communicated to the first public land mobile network 11. According to one example, the user equipment 20 indicates the relative difference of the discontinuous reception scheme applicable for the second public land mobile network 12 (i.e. the second paging occasion time interval 72) to the first public land mobile network 11. This relative timing difference is, e.g., expressed in milliseconds (ms) relative to an actual timing reference of the first public land mobile network 11 or it is being expressed in system (sub- or radio) frames.

According to the present invention, the first public land mobile network 11 acts, e.g., as a voice service public land mobile network, and the second public land mobile network 12 acts as a data service public land mobile network, or vice versa.

If the serving radio network of the first public land mobile network 11 is aware of the relative discontinuous reception timing of the second public land mobile network 12, it could adjust its own discontinuous reception scheme to the discontinuous reception scheme configured from the other public land mobile network in order to put the different paging occasion time intervals (i.e. the time during which the DSDS terminal is awake and needs to receive the paging channel) together so that the user equipment 20 can apply a single discontinuous reception cycle instead of waking up two times, one time per discontinuous reception cycle per public land mobile network.

The indication of the (absolute) time of the first paging occasion time interval 71 can, e.g., be achieved by indication the relative timing offset between the first modified paging occasion time interval 71' of the first public land mobile network 11. The indication of the absolute time of the first paging occasion time interval 71 can, e.g., be given in milliseconds from a timing structure of the first public land mobile network 11. Exemplarily this could be achieved by an indication of the sort:

"first paging occasion time interval 71 starts at [T0+x ms] (with x being between 0 and max. DRX cycle length (e.g. 2560 ms)), where T0 corresponds to a timing structure of the first public land mobile network 11. Similar, especially for the operation of the DSDS user equipment 20 in the same PLMN and using the same RAT (Radio Access Technology), it can be achieved by indicating the relative timing offset in terms on number of system (sub- or radio) frames.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for using a user equipment with a first public land mobile network (PLMN) and with as second PLMN, the method comprising:
    operating the user equipment in a plurality of idle modes;

wherein the user equipment is a Dual Subscriber Identity Module (SIM) Dual Standby (DSDS) user equipment, wherein with respect to the first PLMN and with respect to an idle mode of the user equipment in the first PLMN, a first discontinuous reception scheme is implemented in case that the first PLMN is a registered public land mobile network (RPLMN) to the user equipment, wherein the first discontinuous reception scheme of the user equipment comprises a first time interval, a first paging time, and a first paging occasion time interval, wherein the first time interval corresponds to a first discontinuous reception cycle length, wherein the first paging time is within the first time interval and is indicative of a time offset between the beginning of the first time interval and the beginning of the first paging occasion time interval, and wherein the first paging occasion time interval corresponds to the user equipment being tuned to the first PLMN, wherein with respect to the second PLMN and with respect to an idle mode of the user equipment in the second PLMN, a second discontinuous reception scheme is implemented in case that the second PLMN is a RPLMN to the user equipment, wherein the second discontinuous reception scheme of the user equipment comprises a second time interval, a second paging time, and a second paging occasion time interval, wherein the second time interval corresponds to a second discontinuous reception cycle length, wherein the second paging time is within the second time interval and is indicative of a time offset between the beginning of the second time interval and the beginning of the second paging occasion time interval, and wherein the second paging occasion time interval corresponds to the user equipment being tuned to the first PLMN, wherein the beginning of the first paging occasion time interval and the beginning of the second paging occasion time interval are spaced in time in a predetermined manner by a separation time interval.

2. The method according to claim 1, wherein, in a first mode of operation of the user equipment, only the first PLMN is a RPLMN to the user equipment, wherein, in a second mode of operation of the user equipment, only the second PLMN is a RPLMN to the user equipment, wherein, in a third mode of operation of the user equipment, both the first and the second PLMNs are RPLMNs to the user equipment, wherein the first and second discontinuous reception schemes are implemented in the third mode of operation of the user equipment, wherein either:
in the first mode of operation of the user equipment, a first modified discontinuous reception scheme is implemented with respect to the first discontinuous reception scheme, wherein the first modified discontinuous reception scheme comprises at least a first modified paging time different from the first paging time, the second discontinuous reception scheme being identical in the second and third modes of operation, or in the second mode of operation of the user equipment, a second modified discontinuous reception scheme is implemented with respect to the second discontinuous reception scheme, wherein the second modified discontinuous reception scheme comprises at least a second modified paging time different from the second paging time, the first discontinuous reception scheme being identical in the first and third modes of operation, or in the first mode of operation of the user equipment, a first modified discontinuous reception scheme is implemented with respect to the first discontinuous reception scheme, wherein the first modified discontinuous reception scheme comprises at least a first modified paging time different from the first paging time, and in the second mode of operation of the user equipment, a second modified discontinuous reception scheme is implemented with respect to the second discontinuous reception scheme, wherein the second modified discontinuous reception scheme comprises at least a second modified paging time different from the second paging time.

3. The method according to claim 2, wherein during changing, from either the first or the second mode of operation of the user equipment to the third mode of operation of the user equipment, a first timing information is transmitted from the user equipment to the first PLMN and/or a second timing information is transmitted from the user equipment to the second PLMN, the first timing information being indicative of the difference between the first modified discontinuous reception scheme and the first discontinuous reception scheme, the second timing information being indicative of the difference between the second modified discontinuous reception scheme and the second discontinuous reception scheme.

4. The method according to claim 2, wherein during the third mode of operation of the user equipment, a first timing information is transmitted from the user equipment to the first PLMN and/or a second timing information is transmitted from the user equipment to the second PLMN, the first timing information being indicative of the difference between the first modified discontinuous reception scheme and the first discontinuous reception scheme, the second timing information being indicative of the difference between the second modified discontinuous reception scheme and the second discontinuous reception scheme.

5. The method according to claim 1, wherein the separation time interval is shorter than 50 milliseconds.

6. The method according to claim 3, wherein the first timing information indicates:
the first paging time or
the first paging time and the first time interval or
the first paging time, the first time interval, and an offset information indicative of the absolute time offset between the beginning of a radio frame in the first PLMN and the beginning of a radio frame in the second PLMN.

7. The method according to claim 3, wherein, via a Radio Resource Control (RRC) connection request message or via a RRC connection request complete message, the first timing information is transmitted from the user equipment to the first PLMN, and/or the second timing information is transmitted from the user equipment to the second PLMN.

8. A user equipment configured for use with a first public land mobile network (PLMN) and with a second PLMN, wherein the user equipment is a Dual Subscriber Identity Module (SIM) Dual Standby (DSDS) user equipment, the user being configured to operate in a plurality of idle modes;
wherein with respect to the first PLMN and with respect to an idle mode of the user equipment in the first PLMN, a first discontinuous reception scheme is implemented in case that the first PLMN is a registered public land mobile network (RPLMN) to the user equipment, wherein the first discontinuous reception scheme of the user equipment comprises a first time interval, a first paging time, and a first paging occasion time interval, wherein the first time interval corresponds to a first discontinuous reception cycle length, wherein the first paging time is within the first time interval and is indicative of a time offset between the beginning of the first time interval and the beginning of the first paging occasion time interval, and wherein the first paging occasion time interval corresponds to the user equipment being tuned to the first PLMN, wherein with respect to the second PLMN and with respect to an idle mode of the user equipment in the second PLMN, a second discontinuous reception scheme is implemented in case that the second PLMN is a RPLMN to the user equipment, wherein the second discontinuous reception scheme of the user equipment comprises a second time interval, a second paging time, and a second paging occasion time interval, wherein the second time interval corresponds to a second discontinuous reception cycle length, wherein the second paging time is within the second time interval and is indicative of a time offset between the beginning of the second time interval and the beginning of the second paging occasion time interval, and wherein the second paging occasion time interval corresponds to the user equipment being tuned to the first PLMN, wherein the beginning of the first paging occasion time interval and the beginning of the second paging occasion time interval are spaced in time in a predetermined manner by a separation time interval.

9. The user equipment according to claim 8, wherein, in a first mode of operation of the user equipment, only the first PLMN is a RPLMN to the user equipment, wherein, in a second mode of operation of the user equipment, only the second PLMN is a RPLMN to the user equipment, wherein, in a third mode of operation of the user equipment, both the first and the second PLMNs are RPLMNs to the user equipment, wherein the first and second discontinuous reception schemes are implemented in the third mode of operation of the user equipment, wherein either:

in the first mode of operation of the user equipment, a first modified discontinuous reception scheme is implemented with respect to the first discontinuous reception scheme, wherein the first modified discontinuous reception scheme comprises at least a first modified paging time different from the first paging time, the second discontinuous reception scheme being identical in the second and third modes of operation, or in the second mode of operation of the user equipment, a second modified discontinuous reception scheme is implemented with respect to the second discontinuous reception scheme, wherein the second modified discontinuous reception scheme comprises at least a second modified paging time different from the second paging time, the first discontinuous reception scheme being identical in the first and third modes of operation, or in the first mode of operation of the user equipment, a first modified discontinuous reception scheme is implemented with respect to the first discontinuous reception scheme, wherein the first modified discontinuous reception scheme comprises at least a first modified paging time different from the first paging time, and in the second mode of operation of the user equipment, a second modified discontinuous reception scheme is implemented with respect to the second discontinuous reception scheme, wherein the second modified discontinuous reception scheme comprises at least a second modified paging time different from the second paging time.

10. The user equipment according to claim 9, configured such that during changing, from either the first or the second mode of operation of the user equipment to the third mode of operation of the user equipment, a first timing information is transmitted from the user equipment to the first PLMN and/or a second timing information is transmitted from the user equipment to the second PLMN, the first timing information being indicative of the difference between the first modified discontinuous reception scheme and the first discontinuous reception scheme, the second timing information being indicative of the difference between the second modified discontinuous reception scheme and the second discontinuous reception scheme.

11. The user equipment according to claim 9, configured such that during the third mode of operation of the user equipment, a first timing information is transmitted from the user equipment to the first PLMN and/or a second timing information is transmitted from the user equipment to the second PLMN, the first timing information being indicative of the difference between the first modified discontinuous reception scheme and the first discontinuous reception scheme, the second timing information being indicative of the difference between the second modified discontinuous reception scheme and the second discontinuous reception scheme.

12. The user equipment according to claim 10, configured such that, via a Radio Resource Control (RRC) connection request message or via a RRC connection request complete message, the first timing information is transmitted from the user equipment to the first PLMN, and/or the second timing information is transmitted from the user equipment to the second PLMN.

13. A non-transitory processor-readable medium having processor-executable instructions stored thereon for using a user equipment with a first public land mobile network (PLMN) and with a second PLMN, the processor-executable instructions, when executed, causing the following to be performed:

operating the user equipment in a plurality of idle modes;

wherein the user equipment is a Dual Subscriber Identity Module (SIM) Dual Standby (DSDS) user equipment, wherein, with respect to the first PLMN and with respect to an idle mode of the user equipment in the first PLMN, a first discontinuous reception scheme is implemented in case that the first PLMN is a registered public land mobile network (RPLMN) to the user equipment, wherein the first discontinuous reception scheme of the user equipment comprises first time interval, a first paging time, and a first paging occasion time interval, wherein the first time interval corresponds to a first discontinuous reception cycle length, wherein the first paging time is within the first time interval and is indicative of a time offset between the beginning of the first time interval and the beginning of the first paging occasion time interval, and wherein the first paging occasion time interval corresponds to the user equipment being tuned to the first PLMN, wherein with respect to the second PLMN and with respect to an idle mode of the user equipment in the second PLMN, a second discontinuous reception scheme is implemented in case that the second PLMN is a RPLMN to the user equipment, wherein the second discontinuous reception scheme of the user equipment comprises a second time interval, a second paging time, and a second paging occasion time interval, wherein the second time interval corresponds to a second discontinuous reception cycle length, wherein the second paging time is within the second time interval and is indicative of a time offset between the beginning of the second time interval and the beginning of the second paging occasion time interval, and wherein the second paging occasion time interval corresponds to the user equipment being tuned to the first PLMN, wherein the beginning of the first paging occasion time interval and the beginning of the second paging occasion time interval are spaced in time in a predetermined manner by a separation time interval.

* * * * *